US009324334B2

(12) United States Patent
Fukui et al.

(10) Patent No.: US 9,324,334 B2
(45) Date of Patent: Apr. 26, 2016

(54) SIGNAL PROCESSING APPARATUS, SIGNAL PROCESSING METHOD, AND PROGRAM

(75) Inventors: Takao Fukui, Tokyo (JP); Ayataka Nishio, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 293 days.

(21) Appl. No.: 13/488,679

(22) Filed: Jun. 5, 2012

(65) Prior Publication Data

US 2012/0328123 A1 Dec. 27, 2012

(30) Foreign Application Priority Data

Jun. 27, 2011 (JP) ................................ 2011-141566

(51) Int. Cl.
*H04B 1/10* (2006.01)
*G10L 19/26* (2013.01)
*G10L 21/0388* (2013.01)
*G10L 19/008* (2013.01)

(52) U.S. Cl.
CPC ............ *G10L 19/26* (2013.01); *G10L 21/0388* (2013.01); *G10L 19/008* (2013.01)

(58) Field of Classification Search
USPC .......................................................... 375/350
See application file for complete search history.

(56) References Cited

U.S. PATENT DOCUMENTS 6,460,016 B1 * 10/2002 Sueyoshi et al. ........... 704/200.1
8,243,864 B2 * 8/2012 Ciccarelli et al. ............ 375/350
2006/0177074 A1 * 8/2006 Ko ................................ 381/63
2007/0133831 A1 * 6/2007 Kim et al. ..................... 381/313
2008/0310492 A1 * 12/2008 Kasai et al. ................... 375/232
2009/0052681 A1 * 2/2009 Schobben et al. .............. 381/63
2009/0086982 A1 * 4/2009 Kulkarni et al. .................. 381/1
2010/0027799 A1 * 2/2010 Romesburg et al. ............ 381/28
2010/0066442 A1 * 3/2010 Mu .............................. 327/553
2010/0235171 A1 * 9/2010 Takagi et al. ................. 704/500
2010/0245226 A1 * 9/2010 Higuchi .......................... 345/99
2011/0065408 A1 * 3/2011 Kenington et al. ........... 455/303
2011/0140761 A1 * 6/2011 Nagayama et al. ........... 327/361

FOREIGN PATENT DOCUMENTS

JP 2002-041098 A 2/2002
JP 2005-530205 A 10/2005
JP 2007-240823 A 9/2007
JP 2007-271686 A 10/2007
JP 2008-139844 A 6/2008

OTHER PUBLICATIONS

Purnhagen, "Low complexity parametric stereo coding in mpeg-4", Proc. of the Int'l. Conf on Digital Audio Effects, Oct. 5, 2004, pp. 163-168.
Schroeder, "Natural Sounding Artificial Reverberation", J. of the Audio Engineering Soc., vol. 10, Jul. 1, 1962, pp. 1-5.
Zolzer et al., "Filters" In: Zolzer U: "DAFX: Digital Audio Effects", May 1, 2002, John Wiley & Sons, Ltd, pp. 31-62.

* cited by examiner

*Primary Examiner* — Creighton Smith
(74) *Attorney, Agent, or Firm* — Hazuki International, LLC

(57) ABSTRACT

Provided is a signal processing apparatus, including a filter unit that filters an audio signal created by decimating a portion of frequency components by an all-pass filter and outputs a filtering result thereof as improvement components to improve sound quality of the audio signal, and an adder that generates an improved sound in which the sound quality of the audio signal is improved by adding the improvement components to the audio signal.

18 Claims, 16 Drawing Sheets

A ORIGINAL SOUND

B DECODED OUTPUT SOUND

A

B SPECTRUM OF FILTER OUTPUT IN TRANSITION SEGMENT b1

C SPECTRUM OF FILTER OUTPUT IN STEADY SEGMENT b2

A ORIGINAL SOUND

B DECODED OUTPUT SOUND

C IMPROVED SOUND

A

B

C

SIGNAL PROCESSING APPARATUS, SIGNAL PROCESSING METHOD, AND PROGRAM

BACKGROUND

The present technology relates to a signal processing apparatus, a signal processing method, and a program, and in particular, relates to a signal processing apparatus capable of appropriately improving sound quality of an audio signal produced by, for example, decimating a portion of frequency components, a signal processing method, and a program.

When an audio signal is transmitted or recorded in a recording medium, the audio signal is encoded to reduce the amount of data of the audio signal.

When an audio signal is encoded, the amount of data of the audio signal is reduced by deleting, for example, a portion of frequency components from among frequency components of high frequencies.

Thus, a signal obtained by decoding encoded data obtained by encoding an audio signal lacks frequency components of high frequencies of an original sound, which is an audio signal before encoding, and the ambience is damaged and a muffled sound is generated, leading to lower sound quality.

Thus, a method of reproducing a signal of high sound quality by extending the frequency band (generating frequency components of high frequencies) based on frequency components of low frequencies of a signal obtained by decoding encoded data is proposed (see, for example, Japanese Patent Application Laid-Open No. 2008-139844).

SUMMARY

Incidentally, proposals of technology capable of appropriately improving sound quality of an audio signal created by decimating a portion (in several frequencies) of frequency components of an original sound by using, for example, a masking effect are demanded.

The present technology is developed in view of the above circumstances and can appropriately improve sound quality of an audio signal created by decimating a portion (in several frequencies) of frequency components.

A signal processing apparatus and a program according to an aspect of the present technology are a signal processing apparatus and a program causing a computer to function as a signal processing apparatus, including a filter unit that filters an audio signal created by decimating a portion of frequency components by an all-pass filter and outputs a filtering result thereof as improvement components to improve sound quality of the audio signal and an adder that generates an improved sound in which the sound quality of the audio signal is improved by adding the improvement components to the audio signal.

A signal processing method according to an aspect of the present technology is a signal processing method including the steps of filtering an audio signal created by decimating a portion of frequency components by an all-pass filter, outputting a filtering result thereof as improvement components to improve sound quality of the audio signal, and generating an improved sound in which the sound quality of the audio signal is improved by adding the improvement components to the audio signal.

According to an aspect of the present technology, an audio signal created by decimating a portion of frequency components is filtered by an all-pass filter and a filtering result thereof is output as improvement components to improve sound quality of the audio signal. Then, an improved sound in which the sound quality of the audio signal is improved is generated by adding the improvement components to the audio signal.

The signal processing apparatus may be an independent apparatus or an internal block constituting one apparatus.

The program can be provided by transmission via a transmission medium or recording in a recording medium.

According to an aspect of the present technology, sound quality of an audio signal created by decimating a portion of frequency components can appropriately be improved.

DETAILED DESCRIPTION OF THE EMBODIMENTS

Figure 1:
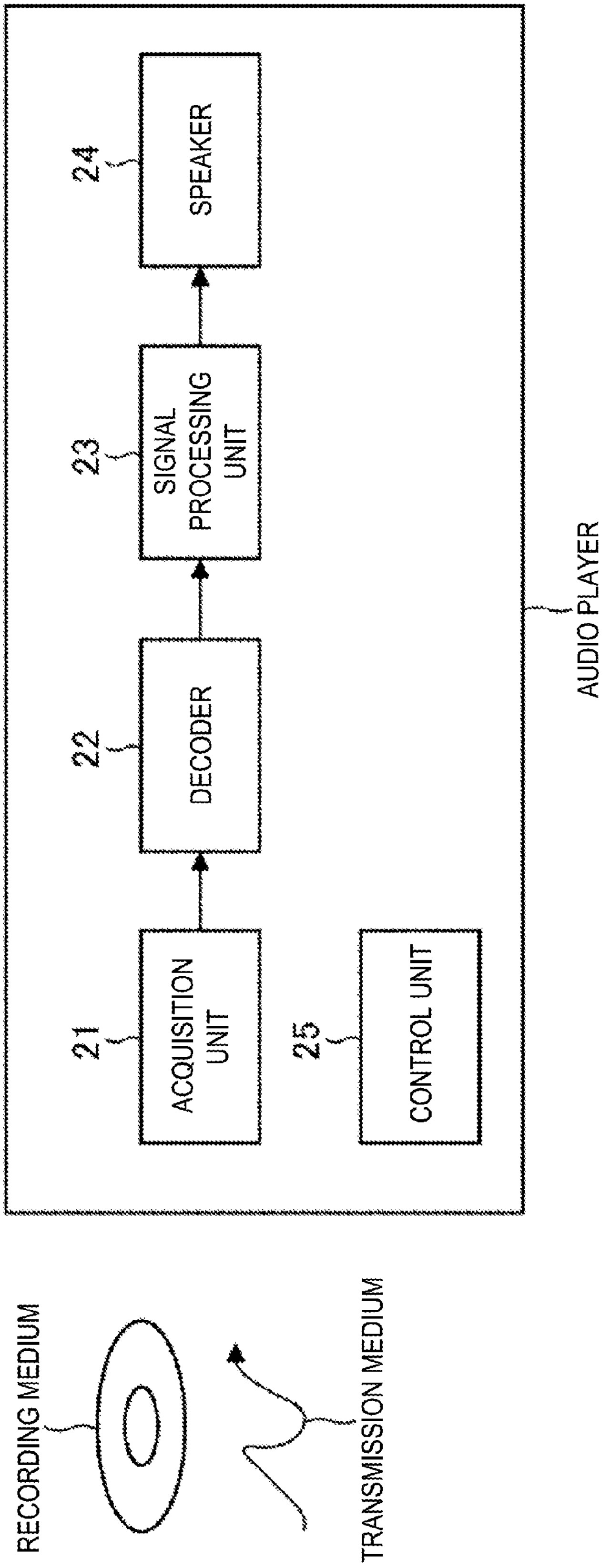
FIG. 1 is a block diagram showing a configuration example of an embodiment of an audio player to which the present technology is applied.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

[Embodiment of an Audio Player to Which the Present Technology is Applied ]

FIG. 1 is a block diagram showing a configuration example of an embodiment of an audio player to which the present technology is applied.

In FIG. 1, the audio player includes an acquisition unit 21, a decoder 22, a signal processing unit 23, a speaker 24, and a control unit 25 to reproduce an audio signal.

The acquisition unit 21 acquires encoded data created by encoding an audio signal of a music piece, sound of TV broadcasting program or the like from a recording medium or transmission medium and supplies the encoded data to the decoder 22.

That is, the acquisition unit 21 has a drive into which, for example, an optical disk (for example, a Blu-Ray (registered trademark) disk) or a memory card (for example, a memory stick (registered trademark)) can be inserted. The acquisition unit 21 acquires encoded data recorded in a recording medium by reproducing (reading) the encoded data from the recording medium inserted into the drive and supplies the data to the decoder 22.

The acquisition unit 21 also has, for example, a network card and a tuner. The acquisition unit 21 acquires encoded data coming by being transmitted via a transmission medium such as the Internet, a terrestrial signal, or a satellite wave by receiving the encoded data and supplies the encoded data to the decoder 22.

The encoded data acquired by the acquisition unit 21 is obtained by, for example, encoding that performs at least processing to decimate a portion of frequency components of an original sound, which is an original audio signal.

In encoding of an original sound, frequency components whose decimating is considered less likely to be perceived by listeners (frequency components harder to hear by listeners due to the masking effect) are decimated by using, for example, the masking effect.

Encoding methods of the above original sound include, for example, AAC (Advanced Audio Coding), mp3 (MPEG Audio Layer 3), AC3 (Audio Code Number 3), and dts (Digital Theater System).

The decoder 22 decodes the encoded data supplied from the acquisition unit 21 and supplies a resultant audio signal (hereinafter, also called a decoded output sound) to the signal processing unit 23.

The signal processing unit 23 performs sound quality improvement processing to improve sound quality and other signal processing on the decoded output sound from the decoder 22 and outputs a resultant audio signal to the speaker 24. Whether to perform the sound quality improvement processing may be set, for example, in accordance with a user's operation.

The speaker 24 outputs (a sound corresponding to) the audio signal from the signal processing unit 23.

The control unit 25 controls each block constituting the audio player.

[Frequency Characteristics of Decoded Output Sound]

Figure 2:
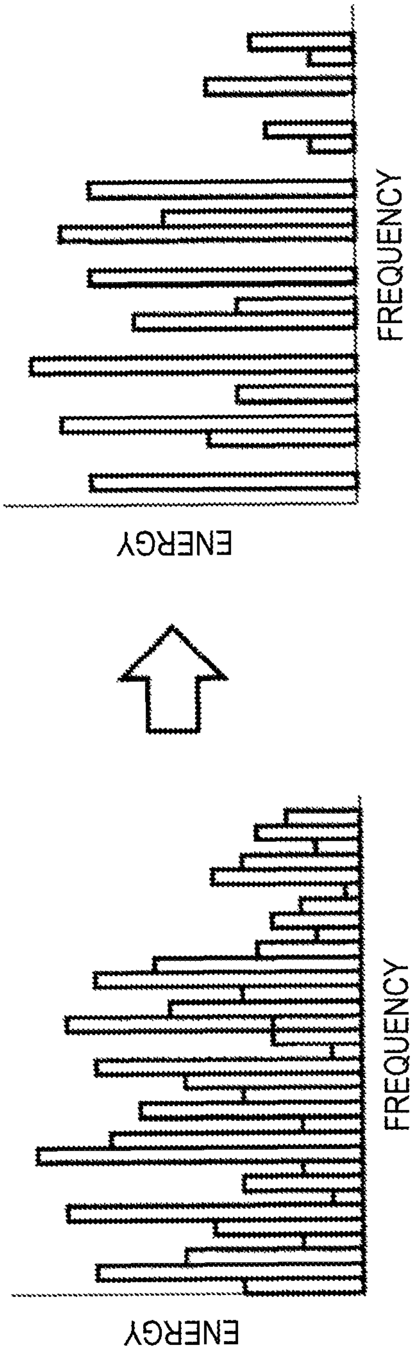
FIGS. 2A-2B are diagrams schematically showing frequency characteristics of an original sound and a decoded output sound.

FIG. 2 is a diagram schematically showing frequency characteristics (amplitude characteristics) of an original sound and a decoded output sound.

FIG. 2A shows frequency characteristics of an original sound and FIG. 2B shows frequency characteristics of a decoded output sound.

As described with reference to FIG. 1, a portion of the original sound is decimated in encoding of the original sound by using the masking effect and thus, frequency characteristics (FIG. 2B) of a decoded output sound created by decoding encoded data obtained by encoding thereof are frequency characteristics obtained by decimating frequency components in several frequencies (in a toothless state) from frequency characteristics (FIG. 2A) of the original sound.

Even if the masking effect is used, a portion of frequency components (in several frequencies) of the original sound is decimated and thus, if a listener hears the decoded output sound as it is, the listener may feel dissatisfied.

To prevent the listener from feeling dissatisfied with sound quality, it is necessary to perform some kind of sound quality improvement processing to improve sound quality on the decoded output sound.

Figure 3:
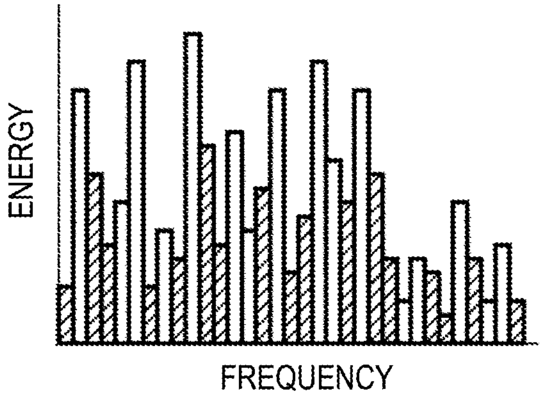
FIG. 3 is a diagram schematically showing frequency characteristics of the decoded output sound after sound quality improvement processing.

FIG. 3 is a diagram schematically showing frequency characteristics of the decoded output sound after the sound quality improvement processing.

In FIG. 3, sound quality improvement processing in which frequencies at which frequency components of the decoded output sound are decimated are recognized from, for example, codec information of encoded data (information contained in encoded data about encoding performed to obtain the encoded data), amplitudes (energy) of decimated frequency components are estimated by considering harmonic components, an envelope and the like, and interpolates frequency components (amplitude components) indicated by oblique lines in FIG. 3 and whose amplitudes are estimated at frequencies at which frequency components are decimated on a frequency axis is performed.

However, to recognize frequencies at which frequency components are decimated from codec information, it becomes necessary to interpret different code information for each encoding method.

In addition, in the sound quality improvement processing in which amplitudes of decimated frequency components are estimated by considering harmonic components, an envelope and the like of the decoded output sound and frequency components are interpolated on the frequency axis, adverse effects such as the decoded output sound after the sound quality improvement processing being an unnatural sound or a sound with extra attendant sound frequently show up.

Thus, the signal processing unit 23 in FIG. 1 performs sound quality improvement processing to appropriately improve sound quality of a decoded output sound created by decimating a portion of frequency components.

[Configuration Example of the Sound Quality Improvement Apparatus ]

Figure 4:
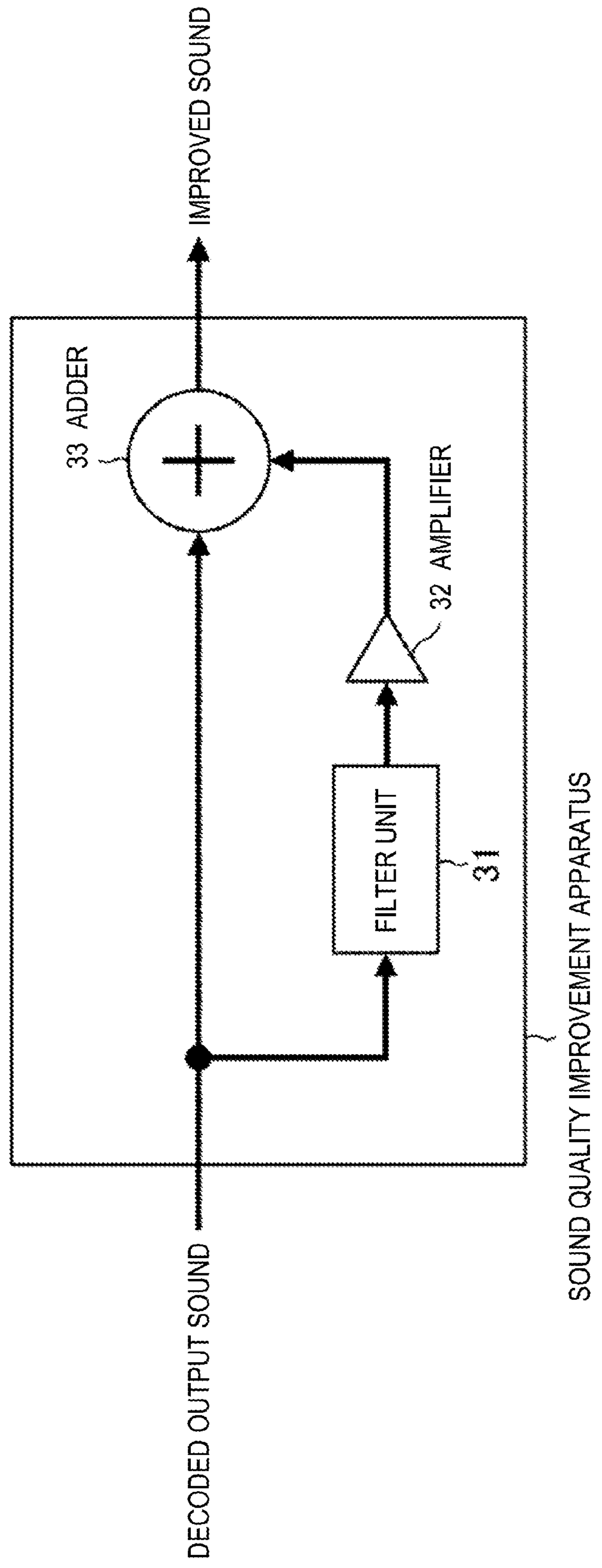
FIG. 4 is a block diagram showing a configuration example of a sound quality improvement apparatus contained in a signal processing unit 23 to perform sound quality improvement processing.

FIG. 4 is a block diagram showing a configuration example of the sound quality improvement apparatus contained by the signal processing unit 23 in FIG. 1 to perform sound quality improvement processing.

In FIG. 4, the sound quality improvement apparatus includes the filter unit 31, an amplifier 32, and an adder 33.

The decoded output sound from the decoder 22 (FIG. 1) is supplied to the filter unit 31 and the adder 33.

The filter unit 31 filters the decoded output sound from the decoder 22, that is, an audio signal (linear PCM (Pulse Code Modulation)) created by decimating a portion (in several places) of frequency components using an all-pass filter and outputs the filtering result as improvement components to improve sound quality of the decoded output sound. Improvement components output by the filter unit 31 are supplied to the amplifier 32.

The amplifier 32 amplifies (attenuates) improvement components from the filter unit 31 by $\alpha$ times, which is a MIX coefficient of the value in the range represented by an equation $0<\alpha<1$, and supplies the components to the adder 33.

The adder 33 generates and outputs an improved sound obtained by improving sound quality of a decoded output sound by adding improvement components from the amplifier 32 to the decoded output sound from the decoder 22. That is, the adder 33 adds the decoded output sound and (α-multiplied) improvement components and outputs the addition result as an improved sound obtained by improving sound quality of the decoded output sound.

Figure 5:
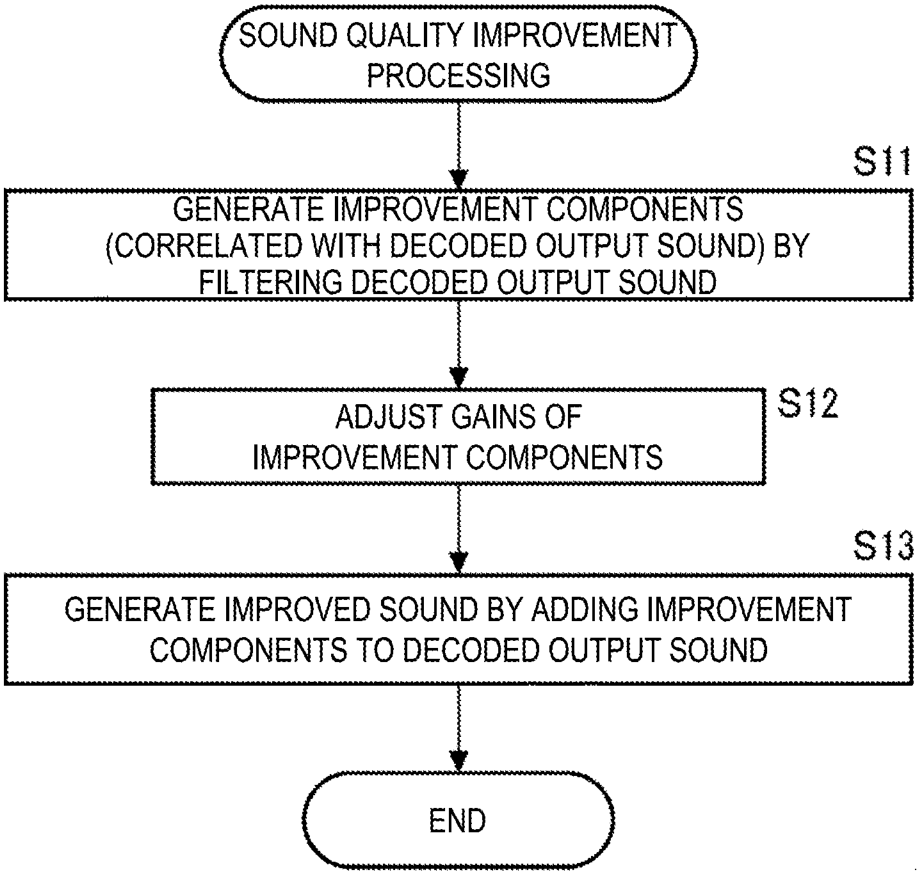
FIG. 5 is a flow chart illustrating processing (sound quality improvement processing) performed by the sound quality improvement apparatus.

FIG. 5 is a flow chart illustrating processing (sound quality improvement processing) performed by the sound quality improvement apparatus in FIG. 4.

In step S11, the filter unit 31 generates improvement components by filtering a decoded output sound from the decoder 22 using an all-pass filter and supplies the improvement components to the amplifier 32 before the processing proceeds to step S12.

In step S12, the amplifier 32 adjusts the gain (amplitude) of the improvement components from the filter unit 31 to α times and supplies the gain to the adder 33 before the processing proceeds to step S13.

In step S13, the adder 33 generates and outputs an improved sound by adding the improvement components from the amplifier 32 to the decoded output sound from the decoder 22.

[Configuration Example of the Filter Unit 31 ]

Figure 6:
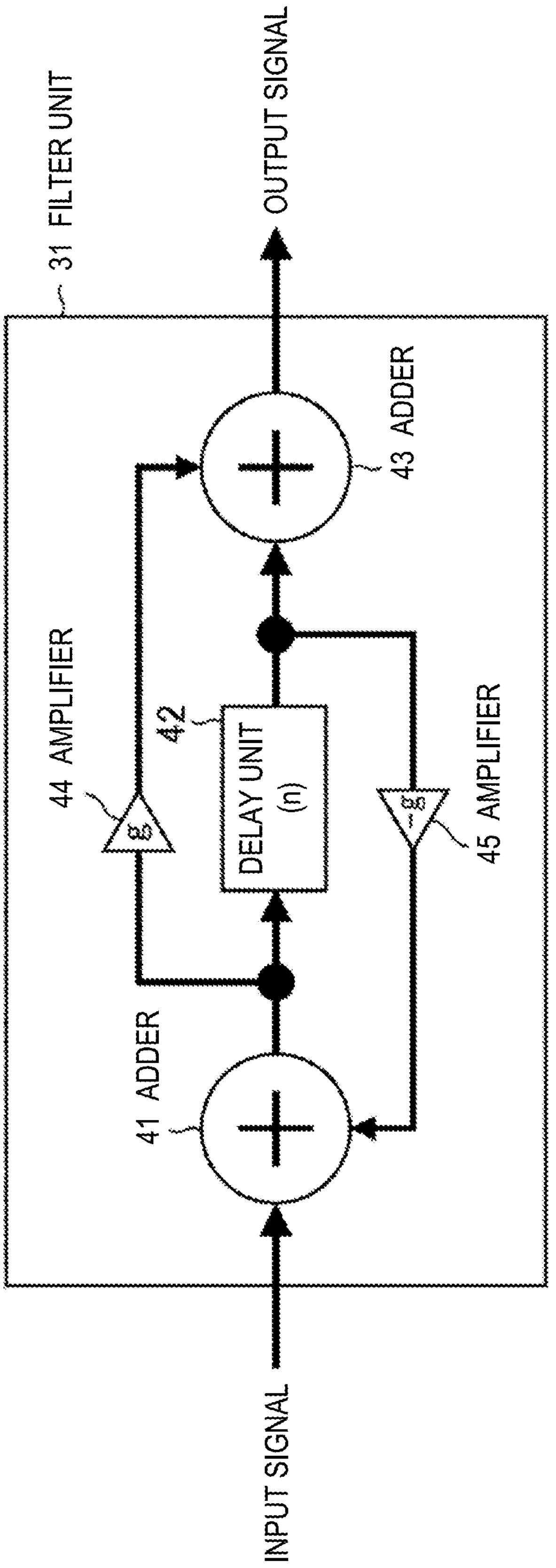
FIG. 6 is a block diagram showing a configuration example of a filter unit 31.

FIG. 6 is a block diagram showing a configuration example of the filter unit 31 in FIG. 4.

In FIG. 6, the filter unit 31 includes an adder 41, a delay unit 42, an adder 43, and amplifiers 44, 45 and constitutes an all-pass filter.

If a (digital) signal to be filtered by an all-pass filter is called an input signal and a (digital) signal obtained by filtering the input signal by the all-pass filter is called an output signal, the input signal is supplied to the adder 41.

The adder 41 adds the input signal and a signal supplied from the amplifier 45 and outputs a resultant added value. The added value output by the adder 41 is supplied to the delay unit 42 and the amplifier 44.

The delay unit 42 includes, for example, a plurality of registers and outputs the added value from the adder 41 after a delay amount (time) corresponding to a tap number n, which is the number of registers constituting the delay unit 42, as a delayed signal. The delayed signal output from the delay unit 42 is supplied to the adder 43 and the amplifier 45.

The adder 43 adds the delayed signal from the delay unit 42 and a signal supplied from the amplifier 44 and outputs a resultant added value as an output signal.

The amplifier 44 amplifies (attenuates) the added value from the adder 41 by g times ($0<g<1$) and supplies the amplified added value to the adder 43.

The amplifier 45 amplifies (attenuates) the delayed signal from the delay unit 42 by −g times and supplies the amplified delayed signal to the adder 41

The all-pass filter as the filter unit 31 configured as described above allows an input signal in all frequency bands to pass and changes only the phase thereof. Therefore, an output signal output from the filter unit 31 is, for example, a signal having the same amplitude characteristics as an input signal and different phase characteristics from the input signal.

[Sound Quality Improvement Processing by the Sound Quality Improvement Apparatus ]

Figure 7:
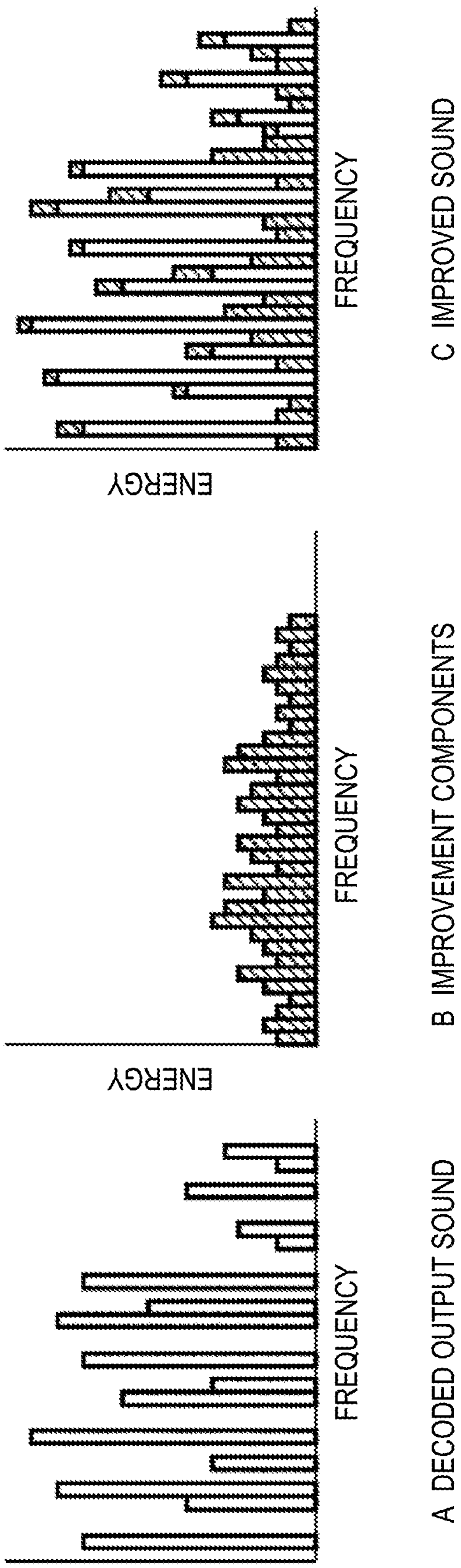
FIGS. 7A-C are diagrams illustrating the sound quality improvement processing by the sound quality improvement apparatus.

FIG. 7 is a diagram illustrating the sound quality improvement processing by the sound quality improvement apparatus in FIG. 4.

FIG. 7A schematically shows frequency characteristics (amplitude characteristics) of a decoded output sound, FIG. 7B schematically shows frequency characteristics of improvement components obtained by the filter unit 31, and FIG. 7C schematically shows frequency characteristics of an improved sound obtained by the adder 33.

In the sound quality improvement apparatus, improvement components are generated by processing on a time axis of filtering a decoded output sound (FIG. 7A) by the all-pass filter in the filter unit 31.

As a result, a signal correlated with the decoded output sound (naturally distorted components) is obtained as improvement components.

Then, in the sound quality improvement apparatus, improvement components are amplified (attenuated) by α (less than 1) times by the amplifier 32 and improvement components are added to the decoded output sound by the adder 33 to determine an improved sound.

That is, the sound quality improvement apparatus generates an improved sound in FIG. 7C by slight (a multiplied) improvement components (FIG. 7B) being added to the decoded output sound (FIG. 7A) on a time axis.

The all-pass filter as the filter unit 31 allows an input signal in all frequency bands to pass and changes only the phase thereof and thus, in a steady state, no frequency component that is not present in the decoded output sound, which is an input signal of the all-pass filter, appears in improvement components, which are an output signal of the all-pass filter.

However, frequency components that are not present in the decoded output sound appear in (α multiplied) improvement components in FIG. 7B. This results from a transient phenomenon. The appearance of frequency components that are not present in a decoded output sound in improvement components will be described with reference to FIG. 8.

Figure 8:
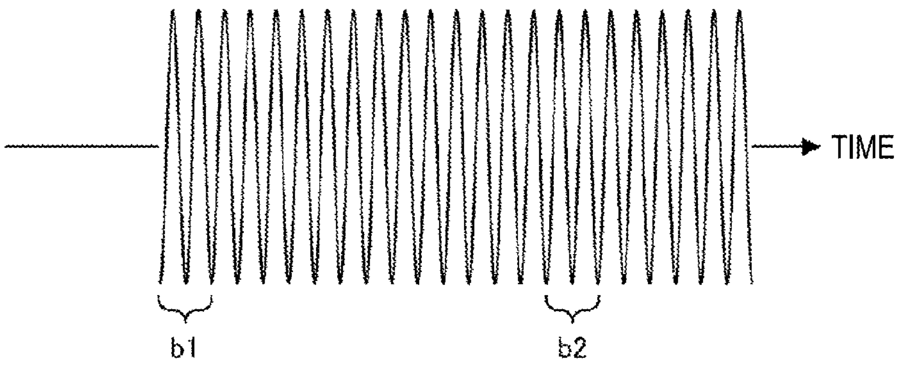
FIGS. 8A-C are diagrams showing an input signal and output signals of an all-pass filter.
Figure 8:
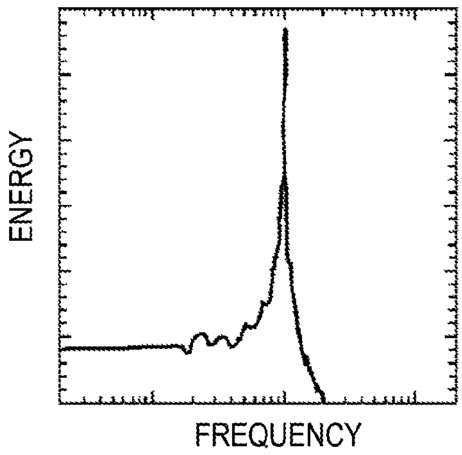
Figure 8:
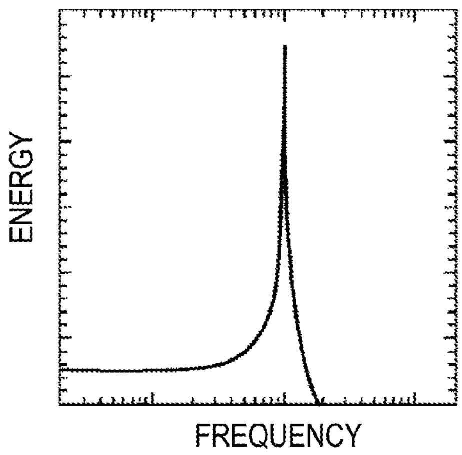

FIG. 8 is a diagram showing an input signal and output signals of an all-pass filter.

FIG. 8A shows a sine wave starting at a predetermined time $t_o$ as an input signal of the all-pass filter.

FIGS. 8B and 8C show frequency characteristics (amplitude characteristics) of an output signal obtained by filtering the input signal in FIG. 8A by the all-pass filter.

FIG. 8B shows frequency characteristics of an output signal when an input signal immediately after the sine wave is started at $t_0$ in a transition segment b1 in which a transient phenomenon occurs in the output signal is filtered.

FIG. 8C shows frequency characteristics of an output signal when an input signal in a steady segment b2 in which the output signal is in a steady state after the sine wave being started is filtered.

It is possible to verify that frequency components of the sine wave are distorted regarding the output signal in the transition segment b1 of FIG. 8B and frequency components of the sine wave are not distorted regarding the output signal in the transition segment b2 of FIG. 8C.

In the transition segment b1, as described above, frequency components of the sine wave are distorted as shown in FIG. 8B and in addition to frequency components of the sine wave, frequency components of surrounding frequencies of frequency components of the sine wave appear.

Then, frequency components appearing at surrounding frequencies of frequency components of the sine wave significantly contribute to improvement of sound quality of the decoded output sound as improvement components.

Because it is necessary to add improvement components to a decoded output sound temporally as close as possible to the decoded output sound used for filtering by the all-pass filter to generate improvement components, the delay amount corresponding to the tap number n of the delay unit 42 constituting the all-pass filter (FIG. 6) as the filter unit 31 needs to be a sufficiently short time.

Thus, the delay amount of the delay unit 42 (FIG. 6) is, for example, a time equal to or less than the length of a frame as the unit of processing in encoding (decoding by extension) of an original sound.

Figure 9:
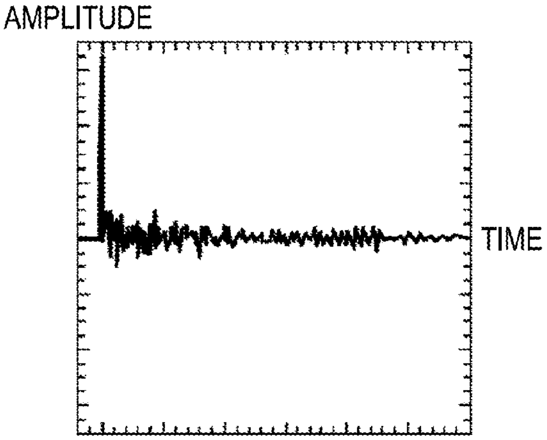
FIGS. 9A-C are waveform diagrams showing an original sound, a decoded output sound, and an improved sound.
Figure 9:
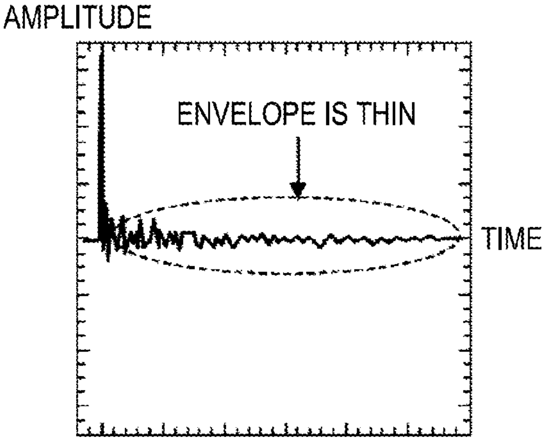
Figure 9:
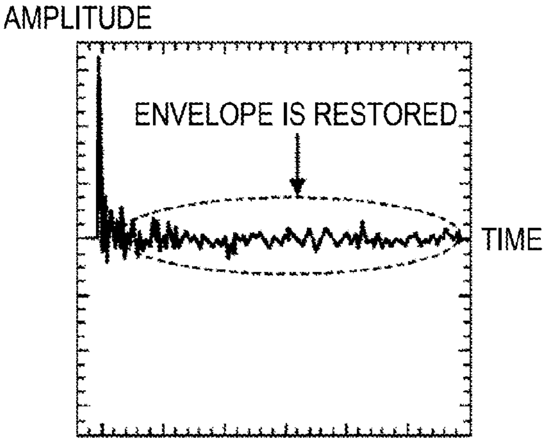

FIG. 9 is a waveform diagram showing an original sound, a decoded output sound, and an improved sound.

FIG. 9A shows an original sound and FIG. 9B shows a decoded output sound obtained by encoding and decoding the original sound in FIG. 9A. FIG. 9C shows an improved sound obtained by performing sound quality improvement processing on the decoded output sound in FIG. 9B by the sound quality improvement apparatus in FIG. 4.

It is possible to verify that compared with the original sound in FIG. 9A, the decoded output sound in FIG. 9B is in a so-called thin state of attendant sound and an envelope that affects a timbre of sound (sound thin state).

It is also possible to verify that for the improved sound in FIG. 9C, the envelope is restored (reconstructed) to a state close to the original sound in FIG. 9A.

According to the sound quality improvement apparatus in FIG. 4, as described above, a decoded output sound output by the decoder 22 is filtered by an all-pass filter and resultant improvement components are added to the decoded output sound to generate an improved sound and therefore, sound quality of the decoded output sound can appropriately be improved.

That is, if, for example, an improved sound is generated by interpolating energy into the decoded output sound on a frequency axis, the sound balance of the improved sound may be lost or the improved sound may be an unnatural sound.

On the other hand, when improvement components obtained by filtering a decoded output sound by an all-pass filter are added to the decoded output sound (on a time axis), the sound balance of the improved sound is not lost and the improved sound will not be an unnatural sound.

According to the sound quality improvement apparatus in FIG. 4, as described with reference to FIG. 9, the envelope of the improved sound is restored to a state close to that of the original sound and thus, a so-called pull of vocals or the like resulting from a sound thin state caused by decimating a portion of frequency components during encoding of the original sound can be mitigated.

Further, with the envelope of the improved sound being restored (put in order), the localization of a sound image becomes clear so that a wide sound field (particularly surround) close to the original sound can be obtained.

Moreover, the sound quality improvement processing by the sound quality improvement apparatus in FIG. 4 can be performed swiftly under a light load. That is, if the sound quality improvement apparatus in FIG. 4 is configured by using, for example, the processor ADSP-21488 manufactured by Analog Devices, the sound quality improvement processing can be performed at rates of about 4 MIPS (Million Instructions Per Second) and a memory of the capacity of about 3 KB is enough for the sound quality improvement processing.

Further, the sound quality improvement processing by the sound quality improvement apparatus in FIG. 4 is performed without using codec information and is postprocessing on a time axis subsequent to the decoder 22 and therefore, a decoded output sound created by decimating a portion (in several places) of frequency components can be processed regardless of the encoding method of original sound.

[Other Configuration Examples of the Sound Quality Improvement Apparatus ]

Figure 10:
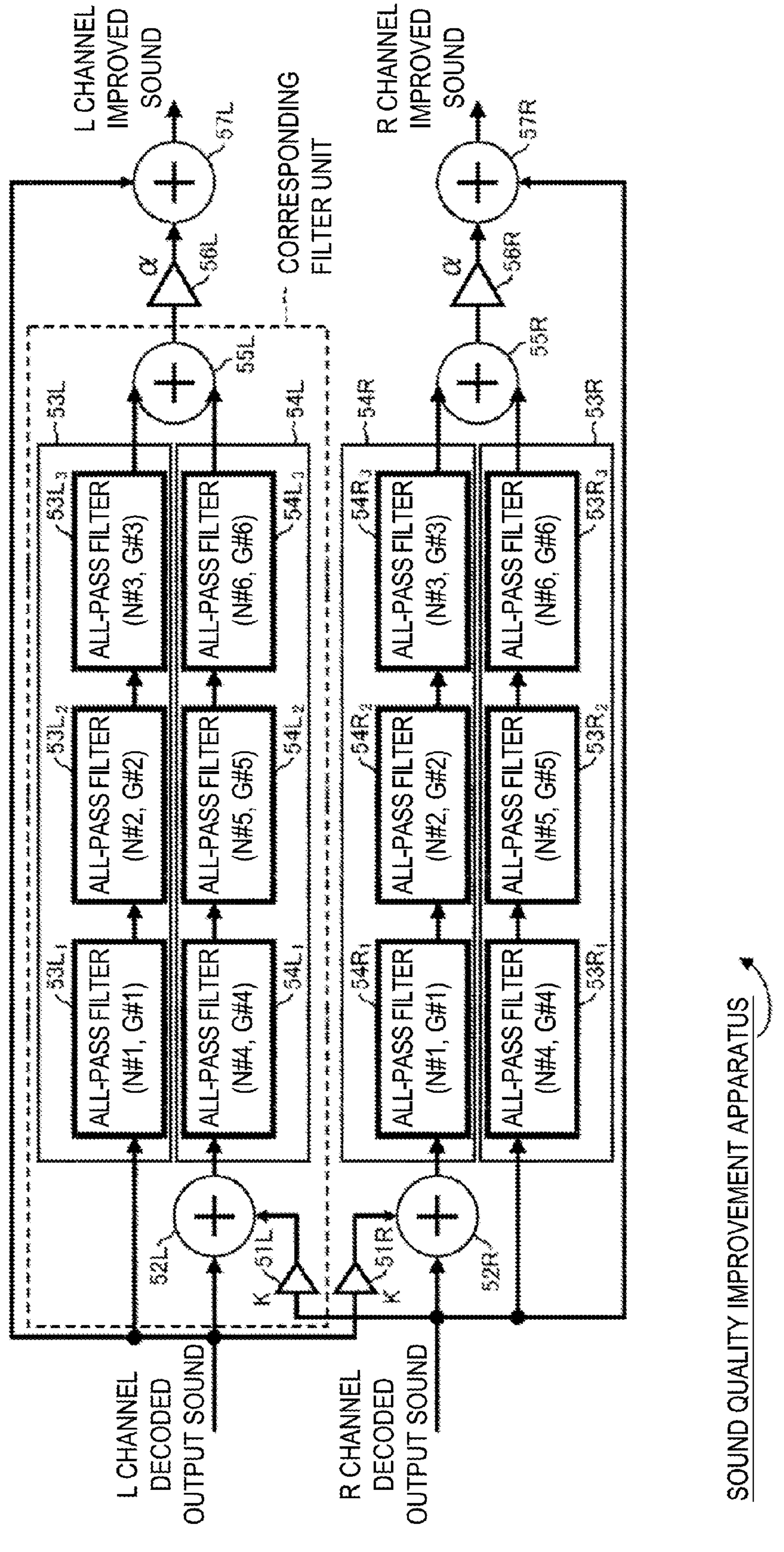
FIG. 10 is a block diagram showing a first configuration example of the sound quality improvement apparatus that processes a 2-channel decoded output sound.

FIG. 10 is a block diagram showing a first configuration example of the sound quality improvement apparatus that processes a 2-channel decoded output sound of L(left) and R(right) channels.

In FIG. 10, the sound quality improvement apparatus performs sound quality improvement processing on each of the decoded output sound of the L channel (hereinafter, also referred to as an L channel decoded output sound) and the decoded output sound of the R channel (hereinafter, also referred to as an R channel decoded output sound) to output an L channel improved sound obtained by improving the L channel decoded output sound and an R channel improved sound obtained by improving the R channel decoded output sound.

In the sound quality improvement apparatus in FIG. 10, two systems of three cascade-connected all-pass filters are provided for each of the L channel and the R channel and a path for crosstalk of the L channel to the R channel and a path for crosstalk of the R channel to the L channel are provided asymmetrically (with respect to the L channel and the R channel).

Therefore, asymmetric processing is performed on the L channel decoded output sound and the R channel decoded output sound in the sound quality improvement apparatus in FIG. 10.

That is, in FIG. 10, the sound quality improvement apparatus includes amplifiers 51L, 51R, adders 52L, 52R, all-pass filters 53$L_1$, 53$R_1$, 53$L_2$, 53$R_2$, 53$L_3$, 53$R_3$, 54$L_1$, 54$R_1$, 54$L_2$, 54$R_2$, 54$L_3$, 54$R_3$, adders 55L, 55R, amplifiers 56L, 56R, and adders 57L, 57R.

In the sound quality improvement apparatus in FIG. 10, the L channel decoded output sound is supplied to the amplifier 51R, the adder 52L, the all-pass filter 53$L_1$, and the adder 57L and the R channel decoded output sound is supplied to the amplifier 51L, the adder 52R, the all-pass filter 53$R_1$, and the adder 57R.

The amplifier 51L amplifies the R channel decoded output sound by K (for example, 0.1) times and supplies the amplified R channel decoded output sound to the adder 52L.

The adder 52L adds the R channel decoded output sound from the amplifier 51L to the L channel decoded output sound and supplies the resultant added value to the all-pass filter 54$L_1$ in the first stage of an all-pass filter block 54L in which the all-pass filters 54$L_1$ to 54$L_3$ are cascade-connected.

The all-pass filter 53$L_1$ is an all-pass filter in the first stage of the all-pass filter block 53L in which the all-pass filters 53$L_1$ to 53$L_3$ are cascade-connected and filters the L channel decoded output sound to supply the filtering result to the all-pass filter 53$L_2$ in the subsequent stage.

The all-pass filters 53$L_1$ to 53$L_3$, the all-pass filters 53$R_1$ to 53$R_3$, the all-pass filters 54$L_1$ to 54$L_3$, and the all-pass filters 54$R_1$ to 54$R_3$ are configured in the same manner as the all-pass filter as the filter unit 31 shown in FIG. 6.

In FIG. 10, (N#j, G#j) shown in a block representing the all-pass filter 53$L_i$ indicates that the delay amount n of the delay unit 42 (FIG. 6) constituting the all-pass filter 53$L_i$ is N#j and the gain g of the amplifier 44 (and the amplifier 45) is G#j.

This also applies to blocks representing the all-pass filters 53$R_i$, 54$L_i$, 54$R_i$.

Therefore, in FIG. 10, the delay amount n and the gain g of the all-pass filter 53$L_i$ are N#i and G#i respectively and match the delay amount n and the gain g of the all-pass filter 54$R_i$.

Also in FIG. 10, the delay amount n and the gain g of the all-pass filter 54$L_i$ are N#(i+3) and G#(i+3) respectively and match the delay amount n and the gain g of the all-pass filter 53$R_i$.

The all-pass filter 53$L_2$ filters the filtering result from the all-pass filter 53$L_1$ in the previous stage to supply the filtering result to the all-pass filter 53$L_3$ in the subsequent stage.

The all-pass filter 53$L_3$ filters the filtering result from the all-pass filter 53$L_2$ in the previous stage to supply the filtering result to the adder 55L.

The all-pass filter 54$L_1$ filters the added value from the adder 52L to supply the filtering result to the all-pass filter 54$L_2$ in the subsequent stage.

The all-pass filter 54$L_2$ filters the filtering result from the all-pass filter 54$L_1$ in the previous stage to supply the filtering result to the all-pass filter 54$L_3$ in the subsequent stage.

The all-pass filter 54$L_3$ filters the filtering result from the all-pass filter 54$L_2$ in the previous stage to supply the filtering result to the adder 55L.

The adder 55L adds the filtering result from the all-pass filter 53$L_3$ and the filtering result from the all-pass filter 54$L_3$ to supply the resultant added value to the amplifier 56L as improvement components.

The amplifier 56L amplifies improvement components from the adder 55L by α (for example, 0.1) times and supplies the amplified improvement components to the adder 57L.

The adder 57L adds improvement components from the amplifier 51L to the L channel decoded output sound and outputs the resultant added value as an L channel improved sound.

The amplifier 51L, the adder 52L, (the all-pass filters 53$L_1$ to 53$L_3$ constituting) the all-pass filter block 53L, (the all-pass filters 54$L_1$ to 54$L_3$ constituting) the all-pass filter block 54L, and the adder 55L correspond to the filter unit 31 in FIG. 4.

If the adder 52L, the all-pass filter blocks 53L, 54L, and the adder 55L corresponding to the filter unit 31 is called a corresponding filter unit, the L channel decoded output sound as an audio signal of one channel of the L channel decoded output sound and R channel decoded output sound is filtered by the all-pass filter block 53L in the corresponding filter unit.

Also in the corresponding filter unit, the R channel decoded output sound output by the amplifier 51L as an audio signal of the other channel is added to the L channel decoded output sound by the adder 52L to cause a crosstalk and a resultant crosstalk signal is filtered by the all-pass filter block 54L.

Then, the filtering result of the L channel decoded output sound by the all-pass filter 53L and the filtering result of the crosstalk signal by the all-pass filter 53L are added by the adder 55L and the resultant added value is output as improvement components of the L channel decoded output sound.

In the amplifier 51R, the adder 52R, the all-pass filters 53$R_1$ to 53$R_3$ constituting the all-pass filter block 53R, the all-pass filters 54$R_1$ to 54$R_3$ constituting the all-pass filter block 54R, the adders 55R, the amplifier 56R, and the adder 57R, the R channel decoded output sound is used, instead of the L channel decoded output sound, and the same processing as that of the amplifier 51L to the adder 57L is performed excluding the fact that the R channel decoded output sound is used, instead of the L channel decoded output sound.

In FIG. 10, the delay amount n and the gain g of the all-pass filter 53$L_i$ constituting the all-pass filter block 53L that filters the L channel decoded output sound are N#i and G#i respectively and the delay amount n and the gain g of the all-pass filter 54$L_i$ constituting the all-pass filter block 54L that filters a crosstalk signal caused by a crosstalk of the R channel decoded output sound to the L channel decoded output sound are N#(i+3) and G#(i+3) respectively.

On the other hand, the delay amount n and the gain g of the all-pass filter 53$R_i$ constituting the all-pass filter block 53R that filters the R channel decoded output sound are N#(i+3) and G#(i+3) respectively and the delay amount n and the gain g of the all-pass filter 54$R_i$ constituting the all-pass filter block 54R that filters a crosstalk signal caused by a crosstalk of the L channel decoded output sound to the R channel decoded output sound are N#i and G#i respectively.

In FIG. 10, as described above, the delay amount n and the gain g of the all-pass filter 53$L_i$ constituting the all-pass filter block 53L that filters the L channel decoded output sound and the delay amount n and the gain g of the all-pass filter 53$R_i$ constituting the all-pass filter block 53R that filters the R channel decoded output sound do not match.

Further, in FIG. 10, the delay amount n and the gain g of the all-pass filter 54$L_i$ constituting the all-pass filter block 54L that filters a crosstalk signal caused by a crosstalk of the L channel decoded output sound and the R channel decoded output sound do not match the delay amount n and the gain g of the all-pass filter 54$R_i$ constituting the all-pass filter block 54R that filters a crosstalk signal caused by a crosstalk of the R channel decoded output sound and the L channel decoded output sound.

Therefore, in FIG. 10, asymmetric processing (here, processing of filtering by the all-pass filters whose delay amounts n and gains g do not match) is performed on the L channel decoded output sound and the R channel decoded output sound.

For example, 0.6484, 0.6016, and 0.5391 can be adopted as gains G#1, G#2, and G#3 respectively and, for example, the same values as those of the gains G#1, G#2, and G#3 can be adopted for gains G#4, G#5, and G#6 respectively.

For example, 97 taps (samples), 61 taps, and 43 taps can be adopted as delay amounts (tap number) N#1, N#2, and N#3 respectively and, for example, 89 taps, 67 taps, and 41 taps can be adopted as delay amounts N#4, N#5, and N#6.

Incidentally, one frame of AAC has 1024 samples and one frame of mp3 has 576 samples. One frame of AC3 has 768 samples at 48 kHz/384 kbps, which is the standard rate of DVD, and one frame of dts used by DVD has 512 samples.

If, for example, 97 taps, 61 taps, and 43 taps described above are adopted as the delay amounts N#1, N#2, and N#3 respectively, the sum total N#1+N#2+N#3 of the delay amounts of the all-pass filters 53L and 54R becomes a time equal to or less than the length of the frame regardless of the encoding method.

Similarly, if 89 taps, 67 taps, and 41 taps described above are adopted as the delay amounts N#4, N#5, and N#6 respectively, the sum total N#4+N#5+N#6 of the delay amounts of the all-pass filters 54L and 53R becomes a time equal to or less than the length of the frame regardless of the encoding method.

Incidentally, the delay amounts and gains of the all-pass filters 53L, 53R, 54L, 54R are not limited to the above values. This also applies to the gains K of the amplifiers 51L, 51R and the gains α of the amplifiers 56L, 56R.

In FIG. 10, a crosstalk of one of the L channel decoded output sound and R channel decoded output sound to the other is caused, but the crosstalk is not required.

Further, in FIG. 10, asymmetric processing is performed on the L channel decoded output sound and the R channel decoded output sound, but symmetric processing (identical processing) can be performed on the L channel decoded output sound and the R channel decoded output sound.

Also in FIG. 10, the all-pass filter blocks 53L, 53R, 54L, 54R are formed by cascade-connecting three all-pass filters, but the all-pass filter blocks 53L, 53R, 54L, 54R may be formed of one all-pass filter or by cascade-connecting a plurality of all-pass filters other than three all-pass filters.

If the all-pass filter block 53L is formed by cascade-connecting a plurality of all-pass filters (this also applies to the all-pass filter blocks 53R, 54L, 54R), improvement components in which distortion is more uniformly spread in a transition period can be obtained.

Figure 11:
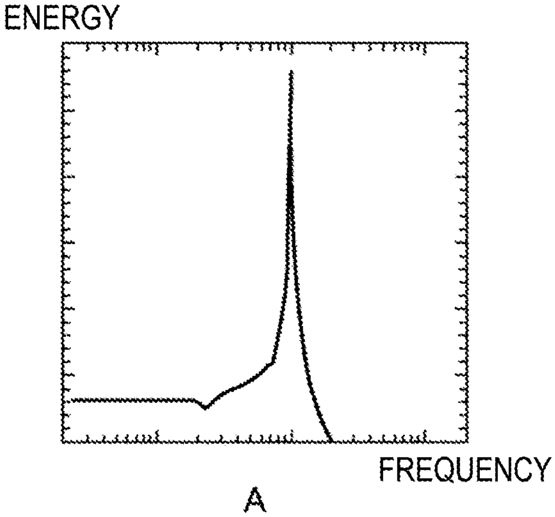
FIGS. 11A-C are diagrams showing frequency characteristics of output of an all-pass filter 53$L_i$ constituting an all-pass filter block 53L.
Figure 11:
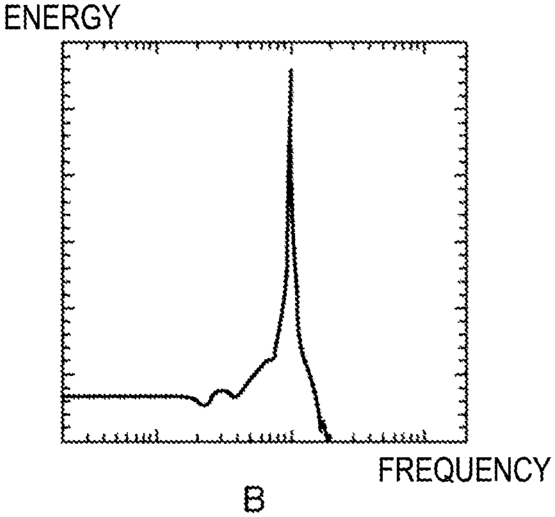
Figure 11:
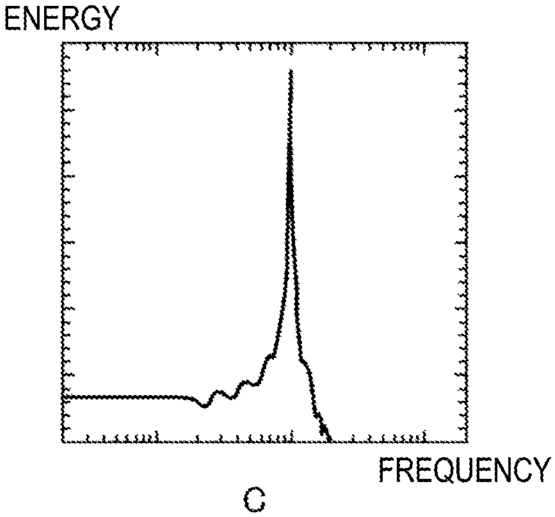

FIG. 11 is a diagram showing frequency characteristics (amplitude characteristics) of output of the all-pass filter $\mathbf{53}L_i$ constituting the all-pass filter block 53L shown in FIG. 10.

That is, FIG. 11A shows frequency characteristics of output of the all-pass filter $\mathbf{53}L_1$ in the first stage constituting the all-pass filter block 53L, FIG. 11B shows frequency characteristics of output of the all-pass filter $\mathbf{53}L_2$ in the second stage, and FIG. 11C shows frequency characteristics of output of the all-pass filter $\mathbf{53}L_3$ in the last stage.

The input into the all-pass filter $\mathbf{53}L_1$ is a sine wave shown in FIG. 8A and started at a predetermined time $t_0$ and all frequency characteristics in FIG. 11 show frequency characteristics of the transition segment b1.

From FIG. 11, it is possible to verify that the later the output of all-pass filters is, the more uniform the distortion of frequency components becomes (frequency components of finer changes appear at surrounding frequencies of frequency components of the sine wave).

Figure 12:
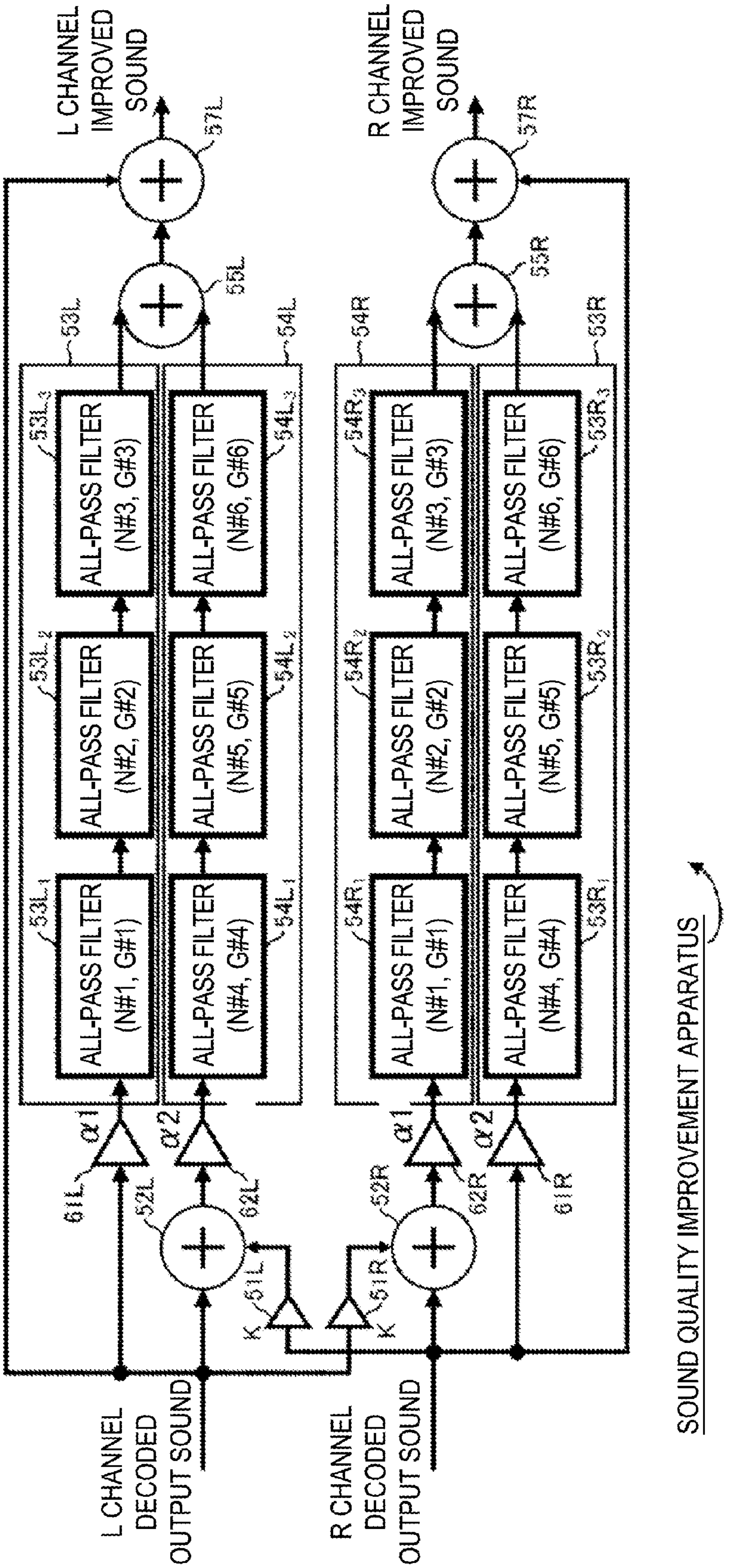
FIG. 12 is a block diagram showing a second configuration example of the sound quality improvement apparatus that processes the 2-channel decoded output sound.

FIG. 12 is a block diagram showing a second configuration example of the sound quality improvement apparatus that processes the 2-channel decoded output sound of the L and R channels.

In FIG. 12, the same reference numerals are attached to corresponding elements in FIG. 10 and a description thereof is omitted below when appropriate.

The sound quality improvement apparatus in FIG. 12 is common to that in FIG. 10 in that the amplifier 51L to the adders 55L, 57L and the amplifier 51R to the adders 55R, 57R are included.

However, the sound quality improvement apparatus in FIG. 12 is different from that in FIG. 10 in that an amplifier 61L is provided prior to the all-pass filter block 53L and an amplifier 62L is provided prior to the all-pass filter block 54L, instead of the amplifier 56L subsequent to the adder 55L, and also an amplifier 61R is provided prior to the all-pass filter block 53R and an amplifier 62R is provided prior to the all-pass filter block 54R, instead of the amplifier 56R subsequent to the adder 55R.

The amplifiers 61L, 62R output a signal input thereinto after amplifying the signal by α1 times.

The amplifiers 62L, 61R output a signal input thereinto after amplifying the signal by α2 times.

The gain α1 of the amplifiers 61L, 62R and the gain α2 of the amplifiers 62L, 61R match at α, the sound quality improvement apparatus in FIG. 12 is a device substantially equivalent to the sound quality improvement apparatus in FIG. 10.

In the sound quality improvement apparatus in FIG. 12, effects of an L channel decoded output sound and a crosstalk signal caused by a crosstalk of an R channel decoded output sound to the L channel decoded output sound on improvement components can separately be adjusted by the gains α1, α2 in the L channel. This also applies to the R channel.

Figure 13:
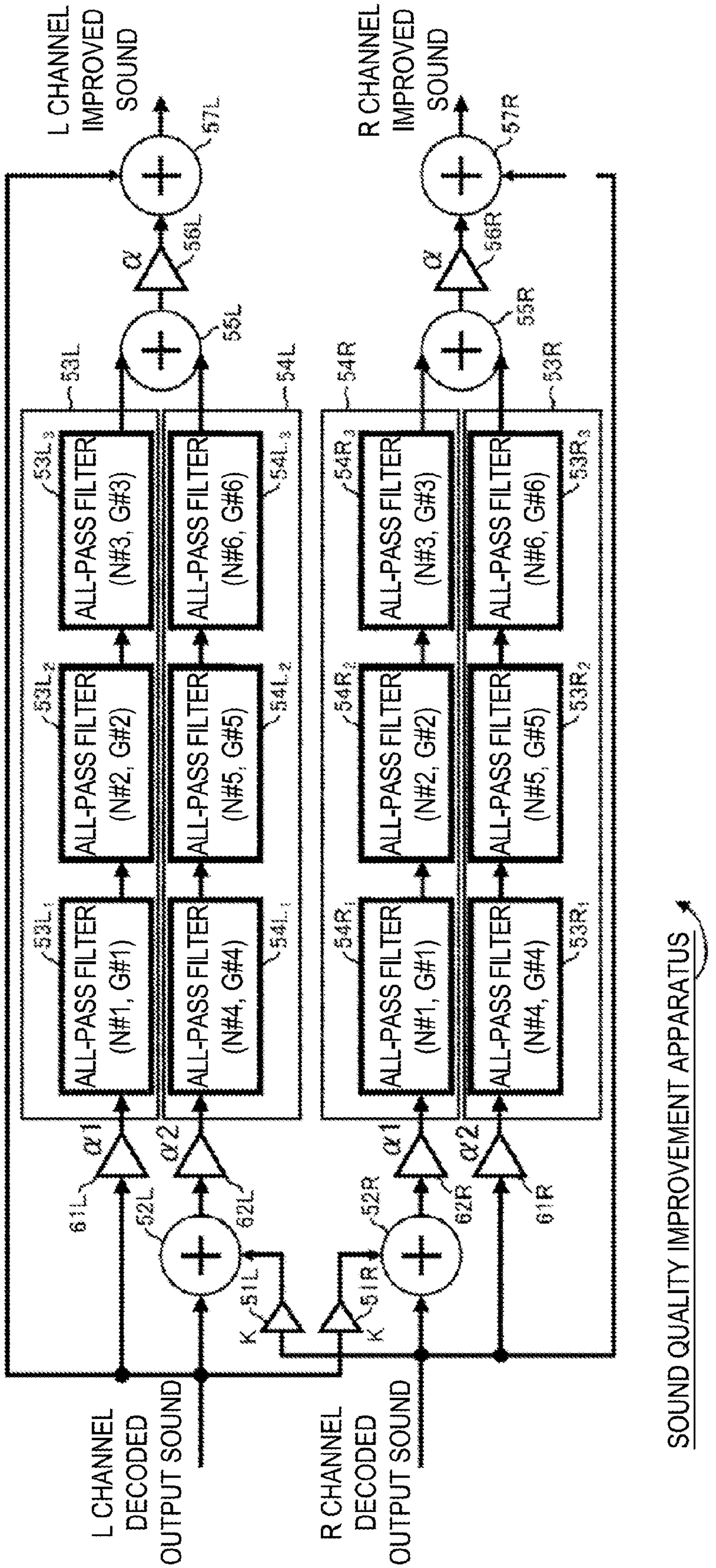
FIG. 13 is a block diagram showing a third configuration example of the sound quality improvement apparatus that processes the 2-channel decoded output sound.

FIG. 13 is a block diagram showing a third configuration example of the sound quality improvement apparatus that processes the 2-channel decoded output sound of the L and R channels.

In FIG. 13, the same reference numerals are attached to corresponding elements in FIGS. 10 and 12 and a description thereof is omitted below when appropriate.

The sound quality improvement apparatus in FIG. 13 is common to that in FIG. 12 in that the amplifier 51L to the adders 55L, 57L, the amplifiers 61L, 62L and the amplifier 51R to the adders 55R, 57R, the amplifiers 61R, 62R are included.

The sound quality improvement apparatus in FIG. 13 is different from that in FIG. 12 in that the amplifier 56L in FIG. 10 is provided subsequent to the adder 55L and the amplifier 56R in FIG. 10 is provided subsequent to the adder 55R.

Therefore, like in FIG. 12, in the sound quality improvement apparatus in FIG. 13, effects of an L channel decoded output sound and a crosstalk signal caused by a crosstalk of an R channel decoded output sound to the L channel decoded output sound on improvement components can separately be adjusted by the gain α1 of the amplifier 61L and the gain α2 of the amplifier 62L in the L channel.

Further, in the sound quality improvement apparatus in FIG. 13, effects of improvement components on an L channel improved sound in the L channel can be adjusted by the gain α of the amplifier 56L.

This also applies to the R channel.

Figure 14:
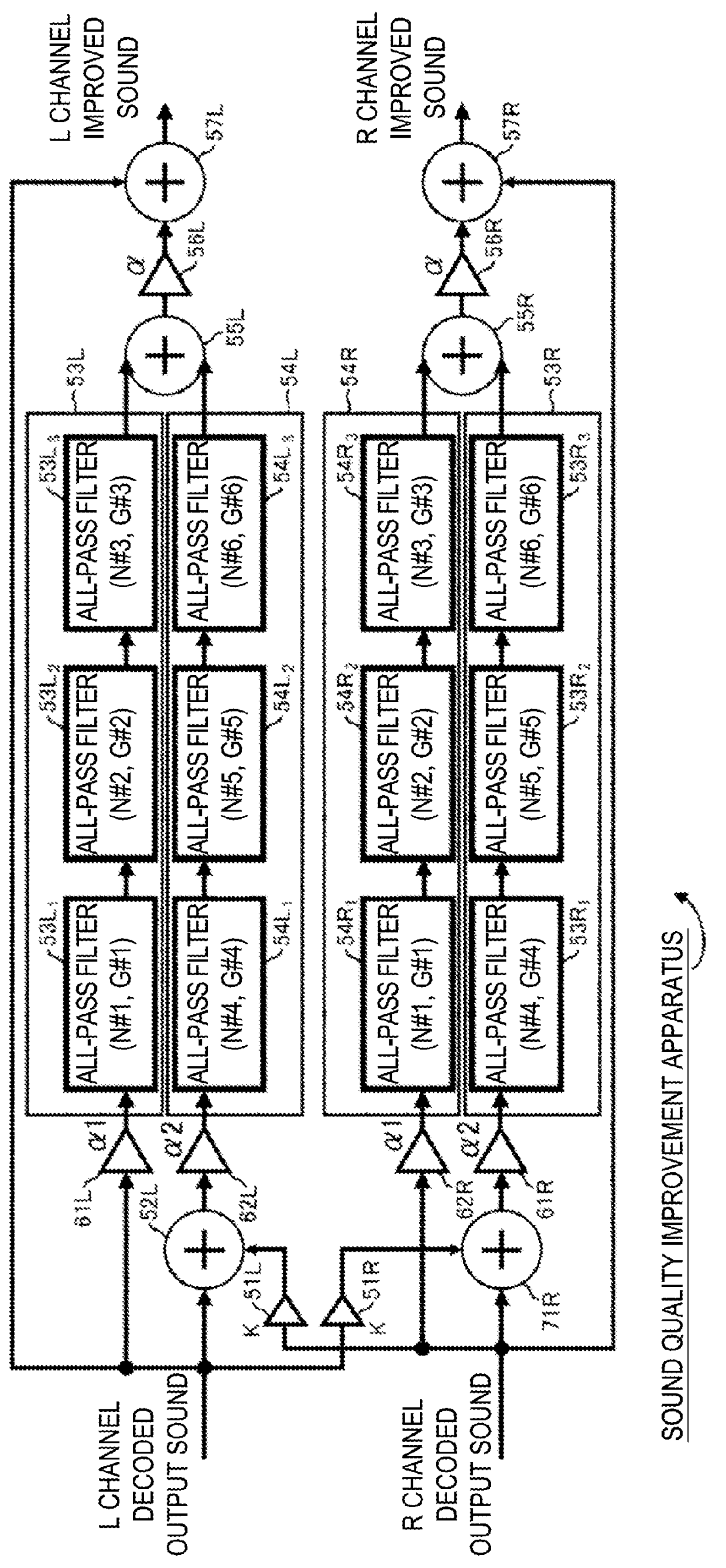
FIG. 14 is a block diagram showing a fourth configuration example of the sound quality improvement apparatus that processes the 2-channel decoded output sound.

FIG. 14 is a block diagram showing a fourth configuration example of the sound quality improvement apparatus that processes the 2-channel decoded output sound of the L and R channels.

In FIG. 14, the same reference numerals are attached to corresponding elements in FIG. 13 and a description thereof is omitted below when appropriate.

The sound quality improvement apparatus in FIG. 14 is common to that in FIG. 13 in that the amplifier 51L to the adder 57L, the amplifiers 61L, 62L and the amplifier 51R, the all-pass filter block 53R to the adder 57R, the amplifiers 61R, 62R are included.

However, the sound quality improvement apparatus in FIG. 14 is different from that in FIG. 13 in that an adder 71R is provided prior to the amplifier 61R, instead of the adder 52R prior to the amplifier 62R.

In FIG. 14, as shown above, the adder 71R is provided prior to the amplifier 61R, instead of the adder 52R prior to the amplifier 62R and thus, in the L channel and the R channel, symmetric processing is performed, instead of asymmetric processing (processing of filtering by the all-pass filters whose delay amounts n and gains g do not match) described with reference to FIG. 10.

Figure 15:
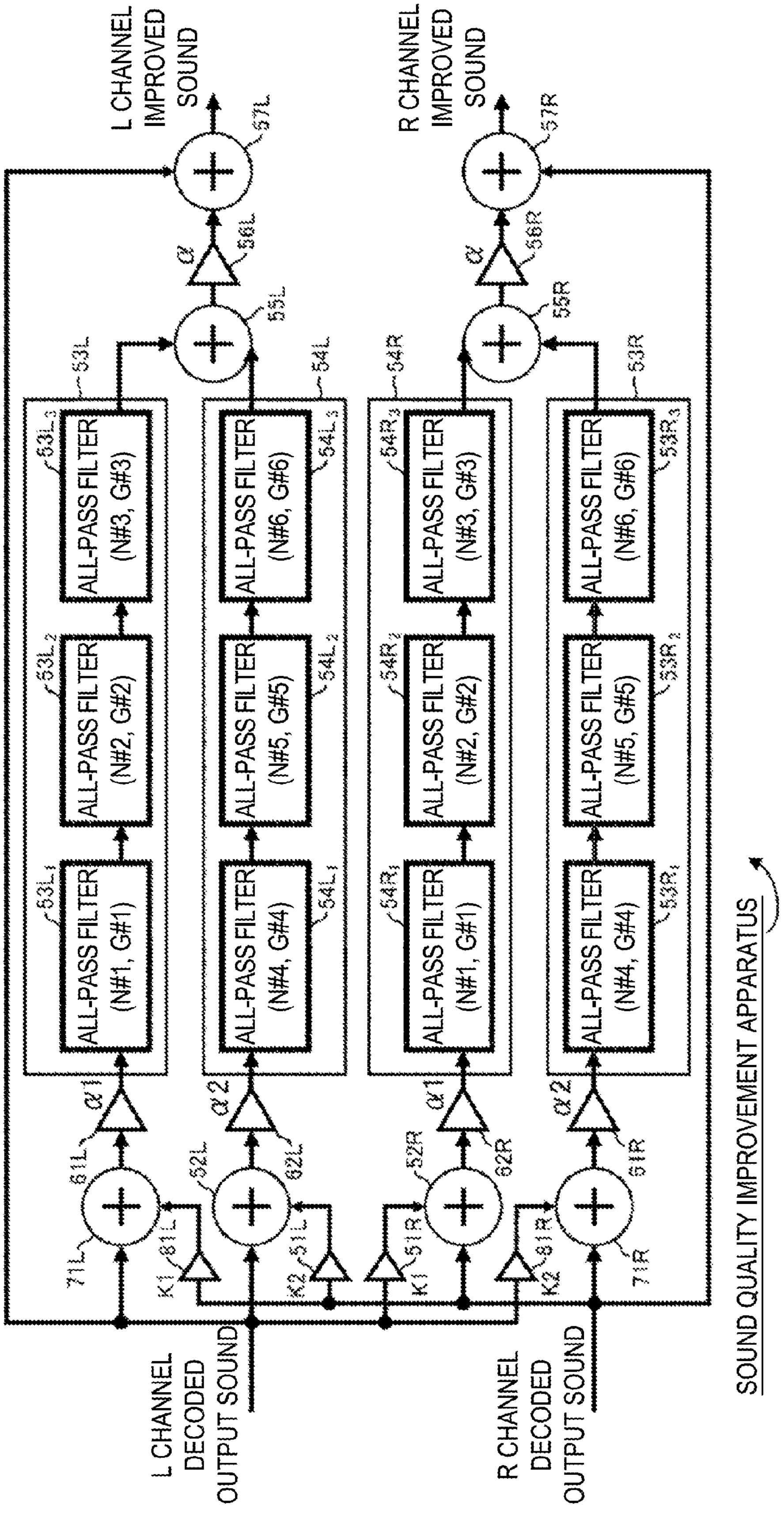
FIG. 15 is a block diagram showing a fifth configuration example of the sound quality improvement apparatus that processes the 2-channel decoded output sound.

FIG. 15 is a block diagram showing a fifth configuration example of the sound quality improvement apparatus that processes the 2-channel decoded output sound of the L and R channels.

In FIG. 15, the same reference numerals are attached to corresponding elements in FIG. 13 and a description thereof is omitted below when appropriate.

The sound quality improvement apparatus in FIG. 15 is common to that in FIG. 13 in that the amplifier 51L to the adder 57L, the amplifiers 61L, 62L and the amplifier 51R to the adder 57R, the amplifiers 61R, 62R are included.

The sound quality improvement apparatus in FIG. 15 is different from that in FIG. 13 in that an adder 71L and an amplifier 81L are provided prior to the amplifier 61L and the adder 71R and an amplifier 81R are provided prior to the amplifier 61R.

In the sound quality improvement apparatus in FIG. 15, an R channel decoded output sound is amplified K1 times by the amplifier 81L and supplied to the adder 71L. The adder 71L causes a crosstalk by adding the R channel decoded output sound from the amplifier 81L to an L channel decoded output sound and supplies the resultant crosstalk signal to the all-pass filter block 53L via the amplifier 61L.

Also, the R channel decoded output sound is amplified by K2 times by the amplifier 51L and supplied to the adder 52L. The adder 52L causes a crosstalk by adding the R channel decoded output sound from the amplifier 51L to the L channel decoded output sound and supplies the resultant crosstalk signal to the all-pass filter block 54L via the amplifier 62L.

On the other hand, the L channel decoded output sound is amplified by K2 times by the amplifier 81R and supplied to the adder 71R. The adder 71R causes a crosstalk by adding the L channel decoded output sound from the amplifier 81R to the R channel decoded output sound and supplies the resultant crosstalk signal to the all-pass filter block 53R via the amplifier 61R.

The L channel decoded output sound is amplified by K1 times by the amplifier 51R and supplied to the adder 52R. The adder 52R causes a crosstalk by adding the L channel decoded output sound from the amplifier 51R to the R channel decoded output sound and supplies the resultant crosstalk signal to the all-pass filter block 54R via the amplifier 62R.

Subsequently, processing similar to that in FIG. 10 will be performed by the sound quality improvement device in FIG. 15.

[Description of a Computer to Which the Present Technology is Applied ]

Next, the above sequence of processing can be performed by hardware or software. If the sequence of processing should by performed by software, a program constituting the software is installed on a general-purpose computer.

Figure 16:
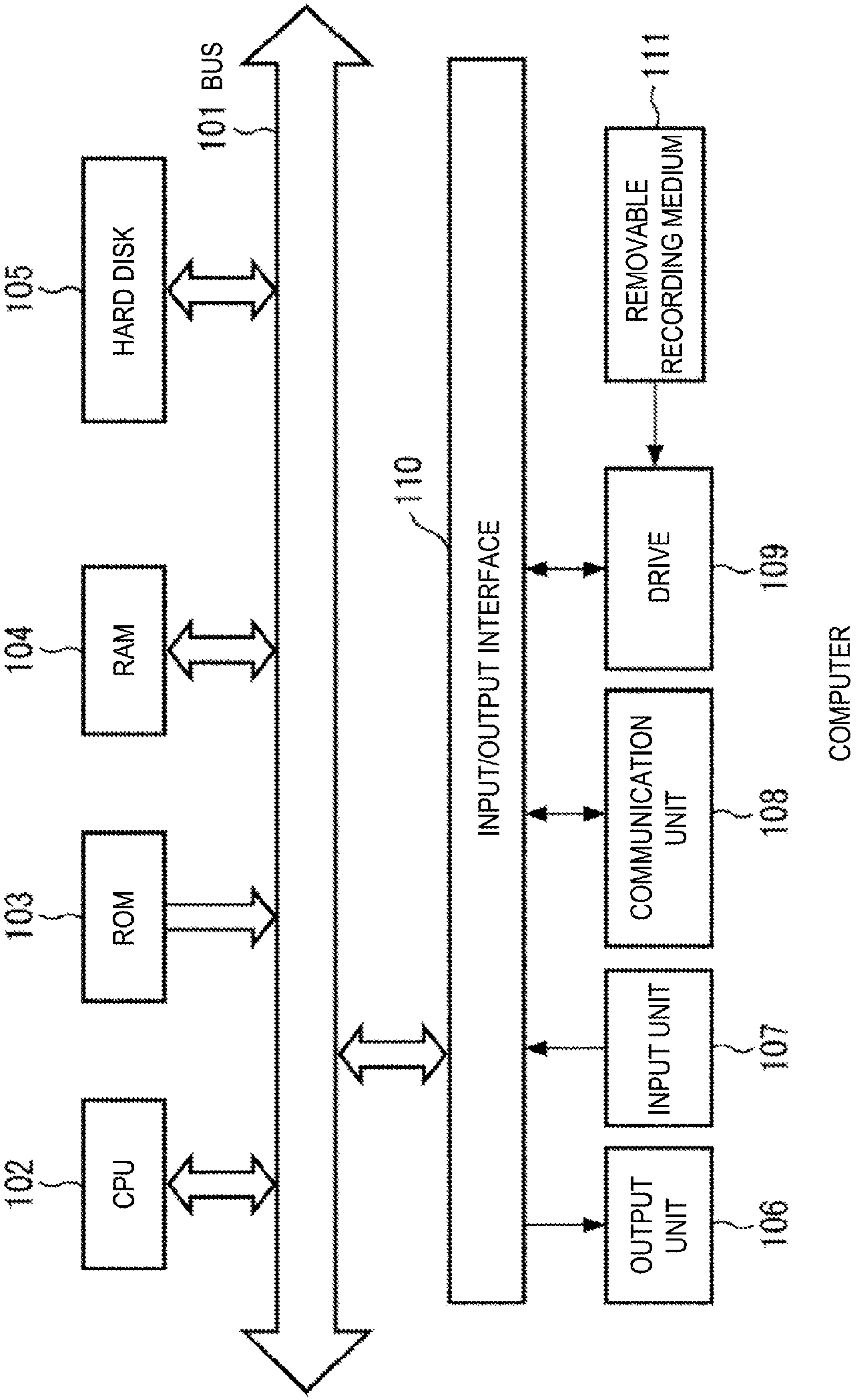
FIG. 16 is a block diagram showing a configuration example of an embodiment of a computer to which the present technology is applied.

FIG. 16 shows a configuration example of an embodiment of a computer on which the program to perform the above sequence of processing is installed.

The program may be recorded in a hard disk 105 or a ROM 103 as a recording medium contained in the computer in advance.

Alternatively, the program may be stored (recorded) in a removable recording medium 111. The removable recording medium 111 can be provided as so-called package software. As the removable recording medium 111, for example, a flexible disk, CD-ROM (Compact Disc Read Only Memory), MO (Magneto Optical) disk, DVD (Digital Versatile Disc), magnetic disk, and semiconductor memory can be cited.

In addition to the above installation of the program from the removable recording medium 111 to the computer, the program can also be installed in the contained hard disk 105 by downloading the program to the computer via a communication network or broadcasting network. That is, the program can be transferred to the computer, for example, from a download site via an artificial satellite for digital satellite broadcasting wirelessly or via a network such as a LAN (Local Area Network) and the Internet by wire.

The computer contains a CPU (Central Processing Unit) 102 and an input/output interface 110 is connected to the CPU 102 via a bus 101.

If an instruction is input into the CPU 102 by the user through an operation of an input unit 107 or the like via the input/output interface 110, the CPU 102 executes the program stored in the ROM (Read Only Memory) 103 according to the program. Alternatively, the CPU 102 loads and executes the program stored in the hard disk 105 by loading the program into a RAM (Random Access Memory) 104.

Accordingly, the CPU 102 performs processing according to the above flow chart or processing performed according to the configuration of the above block diagram. Then, for example, the CPU 102 outputs the processing result from an output unit 106 via the input/output interface 110 or transmits the processing result from a communication unit 108 and further causes the hard disk 105 to record the processing result if necessary.

Incidentally, the input unit 107 is constituted of a keyboard, mouse, microphone or the like. The output unit 106 is constituted of an LCD (Liquid Crystal Display), speaker or the like.

Processing performed by the computer according to a program does not have to be necessarily executed chronologically in the order described as a flow chart. That is, processing performed by the computer according to a program includes processing performed in parallel or individually (for example, parallel processing or processing by an object).

Moreover, a program may be performed by one computer (processor) or a plurality of computer in a distributed manner. Further, a program may be transferred to a remote computer to be executed there.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

[1] A signal processing apparatus, comprising:

a filter unit that filters an audio signal created by decimating a portion of frequency components by an all-pass filter and outputs a filtering result thereof as improvement components to improve sound quality of the audio signal; and an adder that generates an improved sound in which the sound quality of the audio signal is improved by adding the improvement components to the audio signal.

[2] The signal processing apparatus according to [1], wherein the audio signal is obtained by decoding encoded data obtained by encoding that performs at least processing to decimate the portion of frequency components of an original sound.

[3] The signal processing apparatus according to [2], wherein the all-pass filter includes a delay unit that delays a signal, and a delay amount of the delay unit is a time period equal to or less than a length of a frame to be a unit of the processing in the encoding of the original sound.

[4] The signal processing apparatus according to any one of [1] to [3], wherein the filter unit filters the audio signal by a plurality of cascade-connected all-pass filters.

[5] The signal processing apparatus according to any one of [1] to [4], wherein the filter unit filters a first channel audio signal among two channel audio signals by the all-pass filter and also filters a crosstalk signal obtained by causing a crosstalk of a second channel audio signal to the first channel audio signal by the all-pass filter, adds the filtering result of the first channel audio signal to the filtering result of the crosstalk signal, and outputs an added value as the improvement components to improve the sound quality of the audio signal of the one channel.

[6] The signal processing apparatus according to [5], wherein asymmetric processing is performed on the audio signals of the two channels.

[7] A signal processing method, comprising:

filtering an audio signal created by decimating a portion of frequency components by an all-pass filter and outputting a filtering result thereof as improvement components to improve sound quality of the audio signal; and generating an improved sound in which the sound quality of the audio signal is improved by adding the improvement components to the audio signal.

[8] A program causing a computer to function as:

a filter unit that filters an audio signal created by decimating a portion of frequency components by an all-pass filter and outputs a filtering result thereof as improvement components to improve sound quality of the audio signal; and an adder that generates an improved sound in which the sound quality of the audio signal is improved by adding the improvement components to the audio signal.

The present disclosure contains subject matter related to that disclosed in Japanese Priority Patent Application JP 2011-141566 filed in the Japan Patent Office on Jun. 27, 2011, the entire content of which is hereby incorporated by reference.

What is claimed is:

1. A signal processing apparatus, comprising:

a filter unit configured to:

filter an audio signal using an all-pass filter, wherein the audio signal is created by decimating a portion of frequency components of an original sound, and the all-pass filter comprises:

a delay unit configured to delay the created audio signal, an amplifier unit configured to amplify the delayed audio signal using a negative gain value, and a first adder configured to add the created audio signal and the amplified audio signal, and output a filtering result thereof as improvement components to improve sound quality of the audio signal; and a second adder configured to generate an improved sound in which the sound quality of the audio signal is improved by adding the improvement components to the audio signal.

2. The signal processing apparatus according to claim 1, wherein the audio signal is obtained by decoding encoded data obtained by encoding that performs at least processing to decimate the portion of frequency components of the original sound.

3. The signal processing apparatus according to claim 1, wherein the filter unit is configured to filter the audio signal using a plurality of cascade-connected all-pass filters.

4. The signal processing apparatus according to claim 1, wherein the filter unit is configured to:

filter using the all-pass filter a first channel audio signal among two channel audio signals, filter using the all-pass filter a crosstalk signal obtained by causing a crosstalk of the first channel audio signal and a second channel audio signal among the two channel audio signals, add a filtering result of the first channel audio signal to a filtering result of the crosstalk signal, and output an added value as the improvement components to improve the sound quality of the first channel audio signal.

5. The signal processing apparatus according to claim 4, wherein asymmetric processing is performed on the two channel audio signals.

6. A signal processing method, comprising:

filtering an audio signal using an all-pass filter, wherein the audio signal is created by decimating a portion of frequency components of an original sound, and the all-pass filter comprises:

a delay unit configured to delay the created audio signal, an amplifier unit configured to amplify the delayed audio signal using a negative gain value, and a first adder configured to add the created audio signal and the amplified audio signal, outputting a filtering result thereof as improvement components to improve sound quality of the audio signal; and generating an improved sound in which the sound quality of the audio signal is improved by adding the improvement components to the audio signal.

7. A non-transitory computer-readable medium having stored thereon, a set of computer-executable instructions for causing a computer to perform steps comprising:

filtering an audio signal using an all-pass filter, wherein the audio signal is created by decimating a portion of frequency components of an original sound, and the all-pass filter comprises:

a delay unit configured to delay the created audio signal, an amplifier unit configured to amplify the delayed audio signal using a negative gain value, and a first adder configured to add the created audio signal and the amplified audio signal, outputting a filtering result thereof as improvement components to improve sound quality of the audio signal; and generating an improved sound in which the sound quality of the audio signal is improved by adding the improvement components to the audio signal.

8. The signal processing apparatus according to claim 1, wherein the filter unit is configured to output the filtering result by processing the audio signal on a time axis of filtering to generate the improvement components from one or more transients of the audio signal.

9. The signal processing apparatus according to claim 8, wherein the improvement components are generated from frequency components of the one or more transients of the audio signal.

10. The signal processing method according to claim 6, wherein outputting the filtering result comprises outputting the filtering result by processing the audio signal on a time axis of filtering to generate the improvement components from one or more transients of the audio signal.

11. The signal processing method according to claim 10, wherein the improvement components are generated from frequency components of the one or more transients of the audio signal.

12. The non-transitory computer-readable medium according to claim 7, wherein outputting the filtering result comprises outputting the filtering result by processing the audio signal on a time axis of filtering to generate the improvement components from one or more transients of the audio signal.

13. The non-transitory computer-readable medium according to claim 12, wherein the improvement components are generated frequency components of the one or more transients of the audio signal.

14. The signal processing apparatus according to claim 9, wherein at least one of the one or more transients of the audio signal occurs at a start of the audio signal.

15. The signal processing method according to claim 11, wherein at least one of the one or more transients of the audio signal occurs at a start of the audio signal.

16. The non-transitory computer-readable medium according to claim 13, wherein at least one of the one or more transients of the audio signal occurs at a start of the audio signal.

17. The signal processing apparatus according to claim 1, wherein the delay unit comprises a plurality of registers, and a delay amount of the delay unit corresponds to a number of the plurality of registers constituting the delay unit.

18. The signal processing apparatus according to claim 1, wherein a delay amount of the delay unit is a time period less than a length of a frame, the frame being a unit of processing in encoding of the original sound.

* * * * *